Patented Dec. 30, 1947

2,433,742

UNITED STATES PATENT OFFICE 2,433,742

HALOGEN SUBSTITUTED ACRYLONITRILES AS INSECTICIDES

Harold S. Davis, Greenwich, Conn., assignor to American Cyanamid Company, New York, N. Y., a corporation of Maine No Drawing. Application July 7, 1942, Serial No. 450,060

3 Claims. (Cl. 167—22)

The present invention relates to insecticides and more particularly to a class of compounds adapted to the fumigation of enclosed spaces for the eradication of insects and allied pests.

I have found that a halogen substituted acrylonitrile provides a new and effective means for controlling insects, particularly those insects which infest grain, such as for example, the granary weevil, rice weevil, confused flour bettle and the like, and for the extermination of such pests as roaches and carpet bettles which frequent dwellings.

As showing the wide diversity of compounds which may be used for the purposes of my invention, the following may be mentioned: α-chloracrylonitrile, α,β-dichloracrylonitrile, α,β-dibromacrylonitrile, α,β-diiodoacrylonitrile, α-chlor-β-bromacrylonitrile, α-fluor-β-chloracrylonitrile, α-bromacrylonitrile, α-iodoacrylonitrile, α-fluoracrylonitrile, β-chloracrylonitrile, β-bromacrylonitrile, β-fluoracrylonitrile, β,β-dichloracrylonitrile, and β,β-dibromacrylonitrile.

Of the above compounds, the chloracrylonitriles, and in particular the α,β-dichloracrylonitrile, are of especial interest.

When used as fumigating agents, the compound either along or in admixture with others may be applied as for example by atomizing or vaporizing with or without heat into the enclosure a measured quantity of the material either at atmospheric pressure or at reduced air pressures. These compounds may also be introduced into the space to be fumigated in the form of impregnated solids such as kieselguhr or cellulosic board or other absorbent bodies carrying the compounds. They may also be used in the form of solutions or emulsions from which they are subsequently vaporized.

The invention will be illustrated in greater detail by the fumigation tests listed in Table 1 utilizing α,β-dichloracrylonitrile as the fumigant.

Table 1

| Insect | Dosage, Oz. per 1000 Cu. Ft. | Exposure, Hours | Per cent Kill |
|---|---|---|---|
| Rice Weevils | 2.5 | 1 | 60.3 |
| Do | 5.0 | 1 | 100.0 |
| Do | 0.5 | 4 | 100.0 |
| Flour Beetles | 5.0 | 1 | 100.0 |
| Do | 2.0 | 4 | 92.0 |
| Do | 2.5 | 4 | 100.0 |
| Roaches | 0.5 | 4 | 83.0 |
| Do | 1.0 | 4 | 100.0 |
| Larvae of black-carpet beetle | 10.0 | 1 | 47.3 |
|  | 20.0 | 1 | 100.0 |

The fumigation tests listed in Table 2 illustrate the effectiveness of a halogen substituted acrylonitrile as against other typical fumigants.

Table 2

| Fumigant | Minimum Lethal Dose for 4-hr. Exposure, Oz. per 1000 Cu. Ft. | |
|---|---|---|
|  | Rice Weevil | Confused Flour Beetle |
| α,β-dichloracrylonitrile | 0.5 | 2.5 |
| Methyl Bromide | 4.0 | 15.0 |
| Ethylene Oxide | 12.0 | 20.0 |
| Chlorpicrin | 4.0 | 8.0 |

In addition to its insecticidal properties, α,β-dichloracrylonitrile possesses strong lachrymatory and vesicatory properties.

These compounds may be used alone or in admixture with other fumigants, insecticides or diluents, or with compounds which render the liquid or the vapors given off from the liquid non-inflammable and thus completely eliminate the fire hazard.

While the invention has been described with particular reference to specific embodiments it is to be understood that it is not to be limited thereto but is to be construed broadly and restricted solely by the scope of the appended claims.

I claim:
1. A method of combating insects which includes exposing them to a toxic quantity of a halogen substituted acrylonitrile.
2. A method of combating insects which includes exposing them to a toxic quantity of a chloracrylonitrile.
3. A method of combating insects which includes exposing them to a toxic quantity of α,β-dichloracrylonitrile.

HAROLD S. DAVIS.

REFERENCES CITED

The following references are of record in the file of this patent:

UNITED STATES PATENTS

| Number | Name | Date |
|---|---|---|
| 2,231,363 | Long | Feb. 11, 1941 |
| 2,328,984 | Lichty | Sept. 7, 1943 |

FOREIGN PATENTS

| Number | Country | Date |
|---|---|---|
| 494,740 | Great Britain | Jan. 20, 1937 |